United States Patent [19]

Nelson et al.

[11] 4,172,818
[45] Oct. 30, 1979

[54] HYDRODESULFURIZATION OF HYDROCARBON OILS WITH A CATALYST CONTAINING ARSENIC

[75] Inventors: Gerald V. Nelson, Nederland; Charles H. Schrader, Groves; Lee K. Gilmer, Nederland, all of Tex.

[73] Assignee: Texaco Inc., White Plains, N.Y.

[21] Appl. No.: 937,025

[22] Filed: Aug. 25, 1978

[51] Int. Cl.² .............................................. C10G 23/02
[52] U.S. Cl. .................................. 208/216 R; 252/464
[58] Field of Search ..................... 208/216 R, 89, 213; 252/456, 464

[56] References Cited

U.S. PATENT DOCUMENTS

| 3,206,391 | 9/1965 | Gutberlet et al. ..................... 252/464 |
| 3,629,149 | 12/1971 | Mulaskey ............................... 252/456 |
| 3,676,332 | 7/1972 | Johnson et al. .................. 208/216 R |

Primary Examiner—George Crasanakis
Attorney, Agent, or Firm—Thomas H. Whaley; Carl G. Ries; Robert Knox, Jr.

[57] ABSTRACT

The hydrogen consumption in the catalytic desulfurization of hydrocarbon oils is reduced by the incorporation in the catalyst of a small amount of arsenic.

8 Claims, No Drawings

HYDRODESULFURIZATION OF HYDROCARBON OILS WITH A CATALYST CONTAINING ARSENIC

This invention relates to the desulfurization of petroleum fractions. More particularly, it is concerned with the catalytic hydrodesulfurization of petroleum oils under conditions whereby hydrogen consumption is reduced.

The catalytic desulfurization of petroleum oils has been well known in the refining industry for many years having been discussed extensively in "Petroleum Processing" November 1956, pages 116-138. The literature discloses reaction conditions, using a fixed bed of particulate catalyst, in the broad ranges of temperatures of from 400°-900° F., pressures of from 50-5000 psig, hydrogen circulation rates of from 200-20,000 standard cubic feet per barrel (scfb) and space velocities of 0.1-20 volumes of oil per hour per volume of catalyst (v/hr/v.) Conventional catalysts include combinations of Group VI and iron group metals such as cobalt-molybdenum or nickel-tungsten on a refractory inorganic oxide support such as alumina.

Experience has shown that in the commercial desulfurization of petroleum oils, such as naphtha, using fixed beds and conventional desulfurization catalysts, the start-of-run temperature using fresh or freshly regenerated catalyst is usually between about 500° and 700° F. and the end-of-run temperature between about 650° and 800° F. respectively, a gradual increase in temperature being made to compensate for a progressive loss of activity of the catalyst throughout the onstream period. Pressures range generally between about 300 and 1500 psig with hydrogen circulation rates of about 200-10,000 scfb. Ordinarily in conventional commercial units the space velocity is controlled to obtain the desired amount of desulfurization with over 99% desulfurization being common. For the most part, conventional commercial desulfurization units are designed to operate at a space velocity of 1 to 10. It has been generally accepted in the industry that hydrogen consumption is a function of the amount of desulfurization, denitrogenation, olefin and aromatic saturation and hydrocracking, and that as the extent of these reactions increases, so does amount of hydrogen consumed.

For ecological and other reasons, it has become necessary to refine more and more petroleum fractions to reduce the sulfur content thereof thus making desulfurization costs enormous, not only in the amount of new processing equipment that must be built but also in the cost of processing the various petroleum fractions such as the energy necessary for heating and pressurizing the petroleum fraction and in the cost of hydrogen consumed. Process improvements leading to a reduction in hydrogen consumption of even 100 scfb would result in a great economic improvement over current operations.

According to our invention, desulfurization with reduced hydrogen consumption is effected by contacting a sulfur-containing petroleum fraction with added hydrogen at a temperature between about 500° F. and 800° F., a pressure between about 300 and 1500 psig and a space velocity between about 0.5 and 10 in the presence of a hydrogenation catalyst comprising a Group VI metal or compound thereof and an iron group metal or compound thereof on a refractory inorganic oxide support and containing from about 1.0 to 10% by weight arsenic based on the catalyst composite.

The feed used in the process of our invention may be a normally liquid light petroleum oil fraction having an end boiling point between about 400° and 500° F. obtained from various petroleum crude oils, coal tar, shale, tar sands and the like. Generally they contain from about 0.03 to 5.0 weight % sulfur.

The hydrogen used in our process may be obtained from any suitable source such as reformer by-product hydrogen, electrolytic hydrogen or hydrogen produced by the partial oxidation of carbonaceous or hydrocarbonaceous materials followed by shift conversion and $CO_2$ removal. The hydrogen should have a purity of at least 50% and preferably at least 65% by volume.

The catalyst used in the process of our invention comprises a Group VIII metal such as an iron group metal or compound thereof composited with a Group VI metal or compound thereof on a refractory inorganic oxide support. Suitable Group VIII metals are nickel and cobalt which may be used in conjunction with tungsten or molybdenum. Preferably, the metals are in the form of the oxide or sulfide. Advantageously the iron group metal is present in an amount between about 1.0 and 10% by weight of the catalyst composite and the Group VI metal is present in an amount between about 5 and 30% also based by weight on the catalyst composite. Examples of refractory inorganic oxides which may be used as a support are silica, alumina, magnesia, zirconia and the like and mixtures thereof. When the support is composed for the most part of alumina it may be stabilized with a minor amount, e.g. up to about 5 wt. % silica.

The catalyst also contains a small amount, e.g., about from 1 to 10% preferably from about 2 to 6% percent arsenic based on the weight of the catalyst composite. The presence of the arsenic on the catalyst permits effective desulfurization of the oil feed with less consumption of hydrogen than is occasioned when the catalyst does not contain arsenic.

Neither the catalyst nor its preparation form any part of our invention. The catalyst may be prepared in a conventional manner by forming the support which, in a preferred embodiment, is alumina optionally containing a small amount of silica. The support may then be impregnated with the desired metals by use of a solution of a water-soluble compound of the metal. For example, water solutions of ammonium molybdate, cobalt nitrate, nickel nitrate, ammonium metatungstate and arsenic pentoxide may be used for impregnation. After the impregnation of the catalytic materials on the support, the catalyst composite is dried and then calcined for several hours in air at high temperature, e.g., 800°-1000° F.

The catalyst may be used as a slurry, a moving bed, a fixed bed or a fluidized bed. In a preferred embodiment, the catalyst is used as a fixed bed of particles which may be in various shapes, usually as spheres or cylinders. When the catalyst is used as a fixed bed, the oil flow may be either upward or downward with concurrent hydrogen flow or the flow of oil may be downward counter to upwardly flowing hydrogen. In a preferred embodiment the hydrogen and the oil both pass downwardly through a fixed bed of catalyst particles.

In commercial installations it is customary to separate the hydrogen from the desulfurization zone effluent and recycle the separated hydrogen to the desulfurization zone. To prevent the buildup of impurities such as low molecular weight gaseous hydrocarbons, hydrogen sulfide and ammonia, a portion of the recycled hydrogen may be bled from the system and replaced with fresh hydrogen. Hydrogen should also be added to the recycle stream to replace that consumed in the desulfurization process. The ammonia and hydrogen sulfide may also be removed from the hydrogen by scrubbing with a methanolamine-water solution.

Temperature in the desulfurization zone may range between about 500° and 800° F. preferably between 650° and 750° F. Total pressure may be between about 300 and 1500 psig preferably between about 750 and 1000 psig. Space velocities of 0.5 to 10 v/hr/v may be used with space velocities of from 1 to 2 being preferred. Hydrogen circulation rates may range between about 200 and 10,000 scfb, a preferred range being 1000 to 3000 scfb.

The following examples are submitted for illustrative purposes only and it should not be construed that the invention is restricted thereto.

EXAMPLE I

In this example the charge is a naphtha having the following specifications:

Table 1

| Gravity, API | 45.9 |
| --- | --- |
| X-Ray Sulfur, wppm | 180 |
| Mercaptan Sulfur, wppm | 13 |
| Basic N, wppm | 19 |
| Total N, wppm | 68 |
| ASTM Distillation, °F. | |
| IBP-5 vol. % | 211–236 |
| 10–20 vol. % | 243–257 |
| 30–40 vol. % | 269–289 |
| 50 vol. % | 298 |
| 60–70 vol. % | 314–330 |
| 80–90 vol. % | 347–372 |
| 95-EP | 388–411 |

The catalyst is a commercially available desulfurization catalyst having the following analysis:

Table 2

| Chemical Analysis, X-ray | |
| --- | --- |
| Metals, wt. % | |
| Co | 0.04 |
| Mo | 10.6 |
| Ni | 2.9 |
| Silica | <0.05 |
| Alumina | balance |
| Physical Properties | |
| Bulk density, lbs/ft.$^3$ | 39 |
| Surface area, m$^2$/g | 189 |
| Pore volume, cc/g | 0.6 |

Reaction conditions are tabulated below:

Table 3

| Catalyst Bed Temperature, ° F. | 701 |
| --- | --- |
| Reactor Total Pressure, psig | 922 |
| Hydrogen rate, scfb | 2560 |
| Space velocity, v/hr/v | 4.7 |

The sulfur content of the liquid product is 0.4 wppm, the nitrogen content less than 0.2 wppm and hydrogen consumption amounts to 463 scfb.

EXAMPLE II

This example is similar to Example I except that the catalyst was impregnated with As$_2$O$_5$ to formulate a catalyst containing 5 wt. % arsenic. X-ray analysis, however, showed it to contain 4.6 wt. % arsenic.

A series of runs was made similar to that of Example I, the principal difference being the variations in space velocity. Data are presented below:

Table 4

| Run | A | B | C | D | E |
| --- | --- | --- | --- | --- | --- |
| Temp., °F. | 700 | 700 | 699 | 700 | 700 |
| Pressure, psig | 923 | 922 | 921 | 922 | 922 |
| Hydrogen rate, scfb | 2470 | 2433 | 2515 | 2428 | 2408 |
| Space velocity, v/hr/v | 3.51 | 5.0 | 2.02 | 2.02 | 1.55 |
| Sulfur, wppm | 2.7 | 6.9 | 1.4 | 0.9 | 0.8 |
| Total N, wppm | <0.2 | 1.8 | <0.2 | <0.2 | <0.2 |
| Basic N, wppm | none | none | none | none | none |
| H$_2$ consumption, scfb | 328 | 322 | 349 | 347 | 340 |

In every run, the hydrogen consumption is considerably lower than in Example I and the sulfur content is below 10 ppm by weight.

As can be seen from the following example the catalyst containing arsenic pentoxide is also suitable for use in the pretreatment of catalytic reformer feed stock where greater than 99% desulfurization is required.

EXAMPLE III

In this example the charge is a typical catalytic reformer feedstock. In Run A the catalyst of Example I is used and in Run B, the catalyst of Example II is used for the hydrogenation or hydrodesulfurization. In each run a conventional platinum-rhenium on alumina reforming catalyst is used in the catalytic reformer. Reaction conditions and other data are tabulated below:

Table 5

| Run | A | B |
| --- | --- | --- |
| Hydrogenation Severity | | |
| Space velocity, v/hr/v | 1.0 | 1.0 |
| Average Catalyst Bed Temperature, F. | 700 | 700 |
| Gas Rate, scfb | 2500 | 2500 |
| H$_2$, Partial Pressure, psia | 600 | 600 |
| Reformer Feed | | |
| Gravity, °API | 50.6 | 47.5 |
| Nitrogen, wppm | <0.2 | <0.2 |
| Sulfur, wppm | 0.5 | 0.5 |
| Hydrocarbon Type Analysis | | |
| Paraffins, Vol % | 41.4 | 40.0 |
| Olefins | 1.0 | 1.1 |
| Naphthenes | 37.6 | 22.0 |
| Aromatics | 20.0 | 36.9 |
| H$_2$ Consumed, scfb | 770 | 370 |
| Reformer Operation | | |
| Space Velocity, v/hr/v | 2.0 | 2.0 |
| Reactor Pressure, psig | 500 | 500 |
| D.B.* Reformate Yield Basis Hydrotreater Charge at 95 Reformate Research Clear Octane, Vol % | 89.0 | 91.4 |
| Average Reactor Inlet Temperature at SOR** at 95 Reformate Research Clear Octane, °F. | 935 | 906 |

*Debutanized
**Start of Run

It will be noted from above that in the hydrogenation-desulfurization stage in Run B there is a saving in hydrogen consumption of about 400 scfb, that there is also an overall increase in yield of debutanized reformate of almost 2.4 vol. % and that the start of run temperature to obtain a reformate of 95 research octane clear (unleaded) is approximately 30° F. lower in the case of Run B, all of which is evidence of the superior properties of the arsenic-containing catalyst.

Various modifications of the invention as hereinbefore set forth may be made without departing from the spirit and scope thereof, and therefore, only such limitations should be made as are indicated in the appended claims.

We claim:

1. A process for the desulfurization of a sulfur-containing petroleum fraction which comprises contacting said fraction in the presence of added hydrogen at a temperature between about 500° and 800° F., a pressure between about 300 and 1500 psig and a liquid hourly space velocity between about 0.5 and 10 with a hydrogenation catalyst comprising a Group VI metal or compound thereof and an iron group metal or compound thereof on a refractory inorganic oxide support, said catalyst also containing from about 1.0 to 10% by weight arsenic based on the catalyst composite.

2. The process of claim 1 in which the arsenic is deposited on the catalyst in the form of an oxide of arsenic.

3. The process of claim 2 in which the oxide is arsenic pentoxide.

4. The process of claim 1 in which the Group VI metal is molybdenum.

5. The process of claim 1 in which the iron group metal is nickel.

6. The process of claim 1 in which the arsenic is present in an amount between 2 to 6 weight %.

7. The process of claim 1 in which the petroleum fraction is naphtha.

8. The process of claim 7 in which the desulfurized product is subjected to catalytic reforming.

* * * * *